United States Patent [19]

Maginnes et al.

[11] 4,073,089
[45] Feb. 14, 1978

[54] UTILIZATION OF EXHAUST GASES FOR PLANT GROWTH

[75] Inventors: Edward A. Maginnes; Eyrle E. Brooks; Maynard O. Haukeness; George H. Green, all of Saskatoon, Canada

[73] Assignee: Canadian Patents and Development Limited, Ottawa, Canada

[21] Appl. No.: 726,582

[22] Filed: Sept. 27, 1976

[51] Int. Cl.$^2$ ............................................... A01G 9/00
[52] U.S. Cl. .......................................................... 47/17
[58] Field of Search ............................... 47/17, 29, 1.4

[56] References Cited
U.S. PATENT DOCUMENTS 4,003,160   1/1977   Muller ................................. 47/17 X
4,012,867   3/1977   Lainchbury et al. ................. 47/17

Primary Examiner—Robert E. Bagwill
Attorney, Agent, or Firm—Ronald G. Bitner

[57] ABSTRACT

A system for utilizing the exhaust gases from a hydrocarbon combusting apparatus to enhance plant growth comprising an enclosure for plants having an outer covering and an inner permeable membrane spaced from the outer layer, the membrane being less permeable to toxic gases, present in the exhaust, than to $CO_2$, and means for conducting the exhaust gas from the hydrocarbon combusting apparatus to the space between the covering and the permeable membrane. In the preferred embodiment, the outer covering and membrane are transparent to light.

6 Claims, 3 Drawing Figures

UTILIZATION OF EXHAUST GASES FOR PLANT GROWTH

BACKGROUND OF THE INVENTION

This invention relates to the utilization of exhaust gases from a hydrocarbon fuel combusting apparatus for enhancing plant growth.

It is known that the growth of plants can be enhanced by subjecting them to an atmosphere containing $CO_2$ in amounts larger than found in ambient air. Furthermore, in many regions of the world it is desirable or necessary to provide heat to obtain optimum plant growth in all seasons. The exhaust gases from a hydrocarbon combusting apparatus, such as an engine or heater, contains both heat and $CO_2$. However, to date, no entirely satisfactory means has been devised to utilize both the heat and the $CO_2$ for plant growth, and the exhaust gases are normally wasted. One of the difficulties with such exhaust gases, is that they contain, in addition to $CO_2$, other gases which are toxic to plants, notably $NO_x$ ($NO_2$, $NO$) and in some cases $SO_2$. Although heat exchangers can be used to extract the heat from exhaust gases, and known processes could be used to remove noxious gases, the additional costs involved reduce the attractiveness of using exhaust gas for its heat and $CO_2$ content.

SUMMARY OF THE INVENTION

An object of the present invention to utilize the exhaust gases from a hydrocarbon fuel combusting apparatus to enhance plant growth.

One specific object is to utilize the exhaust gas to provide $CO_2$ enrichment.

Another object is to utilize both the $CO_2$ and the heat present in the exhaust gases from a hydrocarbon combusting apparatus to enhance plant growth.

Another object is to supply plants with heat and/or $CO_2$ from the exhaust gases of a hydrocarbon combustion apparatus and to prevent the exhaust gas component noxious to plants from reaching toxic concentration levels.

Another object is to utilize exhaust gases to enhance plant growth employing relatively little additional equipment.

Another object is to more fully utilize hydrocarbon fuel.

It has been found that the $CO_2$ and heat present in the exhaust gases of a hydrocarbon combusting apparatus can be made available to plants to enhance growth, by utilizing a permeable membrane in conjunction with the plant enclosure. It was further found that the membrane may comprise a relatively inexpensive sheet material such as polyethylene, which is presently used as a transparent covering material for greenhouses.

The present invention comprises an enclosure for plants having an outer covering and an inner permeable membrane spaced from the outer layer, the membrane having a lower permeability to the exhaust gas component toxic to plants than to $CO_2$, limiting the passage of gases into the enclosure to a level tolerated by the plants, means for conducting the exhaust gases from the hydrocarbon combusting apparatus to the space between the covering and the permeable membrane, and outlet means for waste gases.

In the preferred embodiment, the outer covering and membrane are transparent to light.

DESCRIPTION OF THE PREFFERED EMBODIMENT

Figure 1:
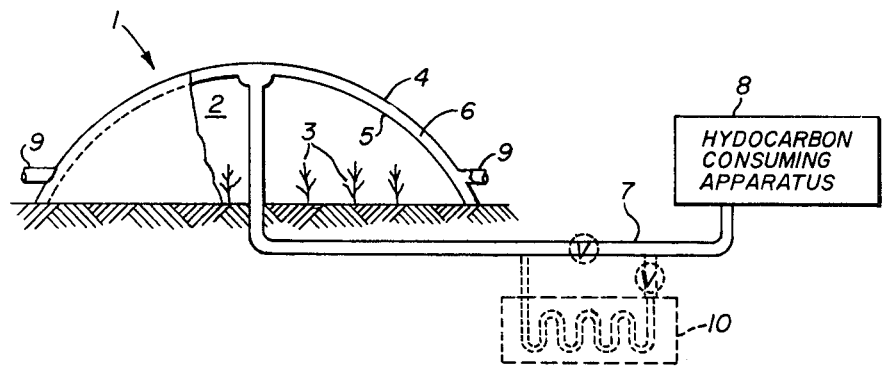
FIG. 1 is a schematic representation of a system for utilizing the exhaust gases from a hydrocarbon combusting apparatus in accordance with the present invention.

Referring to FIG. 1, the system in its simplest form comprises an enclosure 1 defining an enclosed space 2 for plants 3 wherein the enclosure 1 comprising an outer covering 4 and an inner permeable membrane 5 spaced from the outer covering 4 and defining an intermediate space 6. Connected with the space 6 is a conduit 7 for conducting exhaust gases from a hydrocarbon combusting apparatus 8. The membrane 5 is selected to have a lower permeability to the exhaust gas component toxic to plants than to $CO_2$. Waste gas exits from the space 6 at outlet 9.

In operation, the exhaust from the hydrocarbon combusting apparatus 8 is supplied to the space 6, between the outer covering 4 and inner membrane 5. $CO_2$ present in the exhaust gases permeate the membrane 5 providing $CO_2$ enrichment in the enclosed space 2. The selected membrane 5 limits the passage of noxious gases, such as $NO_x$ ($NO_2$, $NO$) and $SO_2$, to a level tolerated by the plants.

Since the exhaust gases from a hydrocarbon combusting apparatus are at an elevated temperature, they can also conveniently provide heat to the enclosed space 2 if required. If heating is not required, the exhaust gases can be cooled by a suitable heat exchanger 10.

Figure 2:
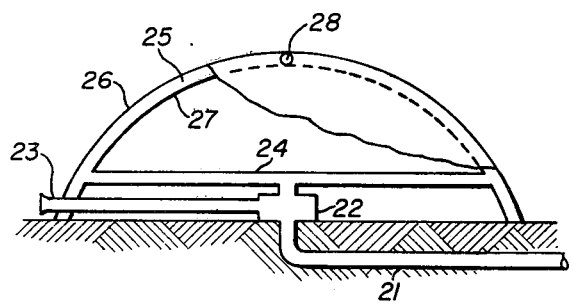
FIG. 2 and 3 illustrate alternate embodiments of the invention.

FIG. 2 illustrates an embodiment of the invention in which the exhaust supplied through conduit 21 is mixed at 22 with ambient air entering at inlet 23. The mixed air is supplied through conduit 24 to the space 25 defined by the outer covering 26 and the inner membrane 27 and exhausted at outlet 28. Mixing of the exhaust gases with ambient air can be used to provide temperature control, or control of exhaust gas concentration passing over the permeable membrane.

Figure 3:
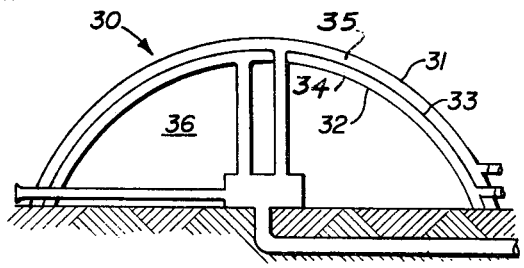

FIG. 3 illustrates an embodiment that facilitates control of $CO_2$ level independently of temperature. The enclosure 30 comprises an outer covering 31 and an inner permeable membrane 32, as in the previous embodiments, but further includes an intermediate non-permeable membrane or sheet 33. By varying the relative flow of exhaust gas to the inner space 34 and outer space 35, the $CO_2$ level in the growing space 36 can be controlled.

$CO_2$ control may also be provided by having a portion of the inner membrane permeable and a portion non-permeable or with relatively low permeability, and controlling the supply of exhaust gases to the corresponding region.

The structural arrangement of the outer covering and membrane may take various forms. For example, either the outer covering or the inner membrane may be attached to structural supporting members, while the other may be spaced from it by spacers or by the pressure of the exhaust gas. Alternatively, the covering may be attached to the outer side of the supporting members while the inner membrane is attached to the inner side. Many of the structual details for the enclosure of the present invention may be similar to present structures which use flexible sheet material as a covering. Also, the enclosure could be of the type inflated by air pressure, in which the supplied exhaust gas provides the support.

For a greenhouse, both the outer covering and the inner membrane will be transparent, while for a growth room one or both may be opaque. If desired, the outer covering may consist of the same material as the membrane, for example polyethylene. While $CO_2$ will also pass through the outer covering if polyethylene is used, the amount lost is reduced when the outside temperature is low relative to that inside, and can be reduced further by using a thicker material for the outer covering.

EXAMPLE

A greenhouse for tomato plants was constructed to utilize the exhaust gas from a gas turbine powered compressor station. The enclosure comprised an outer covering and an inner membrane of transparent 6 mil polyethylene sheeting. The exhaust from the natural gas turbine engine contained 18 to 20ppm $NO_x$, including 16 to 18ppm NO and 2 to 4ppm $NO_2$. The mass flow of exhaust gases was selected to supply the heat loss of the greenhouse through the ground and ends walls which were not heated. Exhaust gases at approximately 500° F were mixed with outdoor air to provide a constant 180° F supply mixture to the space between the inner and outer sheets of polyethylene. Temperature control of the greenhouse was provided by modulating the flow of the exhaust gas. The $CO_2$ level within the enclosure varied between 1500 to 4000 ppm. The maximum $NO_x$ concentration within the enclosure was 1.4ppm consisting of NO with no measurable amounts of $NO_2$, the more toxic gas. An isolated section of the greenhouse was heated with a conventional unit heater for comparison. It was found that the $CO_2$ enriched section provided a significantly greater yield.

The results indicate that polyethylene is a suitable membrane material for the purposes of the present invention. It readily allows passage of $CO_2$, while restricting passage of $NO_x$ and $SO_2$, and at the same time is a relatively inexpensive material.

Experiments were also conducted with materials other than polyethylene which are potential covering materials for greenhouses, and included vinyl, butyrate, and fibreglass. Exhaust gases at 180° F with 3.5 to 5.5 ppm $NO_x$ and 5000 to 6000 ppm $CO_2$ were passed over the test materials. Vinyl allowed $CO_2$ to pass through readily, but at the same time allowed $NO_x$ to gradually build up to toxic levels. Butyrate allowed $NO_x$ to pass through as readily as $CO_2$. Fibreglass was not permeable to $CO_2$ or $NO_x$. In tests with $SO_2$, the exhaust gases were enriched with 10 ppm $SO_2$ from a cylinder. The tests with the above three materials and polyethylene did not cause the $SO_2$ in the test chamber to rise to a measurable level using a titrimetric analysis. The results were verified using live plants in the test chamber, which showed no injury, but would have been damaged at 0.5 ppm. While these results would appear to indicate that neither vinyl, butyrate, nor fibreglass are suitable for purposes of the present invention, additional experiments revealed that various other factors, discussed below, affect permeability and indicte that vinyl, for example, would be suitable and perhaps more desirable than polyethylene, under different conditions, namely higher gas temperatures.

Experiments have indicated that the permeability characteristics of various materials are extremely complex with the multigas mixtures of hydrocarbon fuel exhaust. Factors which affect permeability and the level of gases within the enclosure, and hence determine the choice of a suitable membrane and operating conditions include the following:

(a) Plant tolerance — Different plants can tolerate different levels of toxic gases such as $NO_x$ and $SO_2$. Similarly, different plants will tolerate, or benefit from , different levels of $CO_2$.

(b) The permeability of membranes to combination of gases — Experiments have indicated that $SO_2$ by itself passes freely through polyethylene. However, in combination with other gases, namely those present in hydrocarbon fuel exhaust, the permeability of polyethylene to $SO_2$ was very low.

(c) Temperature of the gas mixture — Experiments with polyethylene revealed that the permeability of $NO_2$ decreased with increasing exhaust temperature while the permeability of $CO_2$ increased.

(d) Area of thickness of the membrane — The total amount of gas passing through the membrane will increase with membrane area and decrease with membrane thickness.

(e) Mixing of the exhaust gases with ambient air — The concentration of toxic gases and $CO_2$ passing into the plant enclosure for a particular system can be reduced by mixing with ambient air. Therefore, a particular membrane which may allow passage of gases in amounts detrimental to plants, when undiluted exhaust gases are supplied, may provide a tolerable mixture when diluted sufficiently with ambient air.

From the foregoing, it will be apparent that the selection of a suitable membrane and operating parameters must be determined for a particular system, taking in to account such factors as the type of plants, the nature of available exhaust gases, climatic conditions, and the like.

We claim:

1. A system for utilizing the exhaust gases from a hydrocarbon combusting apparatus to enhance plant growth, comprising an enclosure for plants having an outer covering and an inner permeable membrane spaced from the outer covering, means for conducting exhaust gases to the space between the covering and the membrane, and outlet means for waste gases from said space, said membrane having a lower permeability to the exhaust gas component toxic to plants than to $CO_2$, limiting the passage of gases into the enclosure to a level tolerated by the plants.

2. The system of claim 1 wherein the outer covering and inner membrane are transparent.

3. The system of claim 1 wherein the inner membrane comprises polyethelene.

4. The system of claim 1 further comprising means for mixing ambient air with the exhaust gases prior to conducting to the space between the covering and the membrane.

5. The system of claim 1 wherein the toxic gases are $NO_2$ and NO.

6. The system of claim 1 wherein the toxic gases are $NO_2$, NO and $SO_2$.

* * * * *